United States Patent
Goel et al.

(10) Patent No.: US 12,452,156 B1
(45) Date of Patent: Oct. 21, 2025

(54) METHODS, SYSTEMS, AND COMPUTER READABLE MEDIA FOR ACTIVELY OBTAINING PRODUCER NETWORK FUNCTION (NF) REACHABILITY STATUS INFORMATION BY NF REPOSITORY FUNCTION (NRF) IN RESPONSE TO NF HEART-BEAT FAILURE

(71) Applicant: Oracle International Corporation, Redwood Shores, CA (US)

(72) Inventors: Yesh Goel, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 46 days.

(21) Appl. No.: 18/637,968

(22) Filed: Apr. 17, 2024

(51) Int. Cl.
*H04L 43/10* (2022.01)
*H04L 43/0811* (2022.01)

(52) U.S. Cl.
CPC .......... *H04L 43/10* (2013.01); *H04L 43/0811* (2013.01)

(58) Field of Classification Search
CPC .............................. H04L 43/10; H04L 43/0811
See application file for complete search history.

(56) References Cited

U.S. PATENT DOCUMENTS

| | | | |
|---|---|---|---|
| 12,155,534 B1 * | 11/2024 | Bertz | H04L 41/12 |
| 12,206,742 B1 * | 1/2025 | Sangameswaran | H04L 67/51 |
| 2022/0346188 A1 * | 10/2022 | Malhotra | H04L 67/51 |
| 2022/0360447 A1 * | 11/2022 | Rajput | H04L 9/3247 |
| 2023/0199497 A1 * | 6/2023 | Krishan | H04L 63/0281 726/12 |
| 2025/0193098 A1 * | 6/2025 | Krishan | H04L 43/08 |

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.6.0 (Mar. 2024).

"3rd Generation Partnership Project; Technical Specification Group Services and System Aspects; System architecture for the 5G System (5GS); Stage 2 (Release 18)", 3GPP TS 23.501, V18.5.0 (Mar. 2024).

* cited by examiner

*Primary Examiner* — Jerry B Dennison
(74) *Attorney, Agent, or Firm* — Jenkins, Taylor & Hunt, P.A.

(57) ABSTRACT

A method for actively obtaining producer network function (NF) reachability status information by an NF repository function (NRF) in response to an NF heart-beat failure includes detecting, by an NRF, an NF heart-beat failure associated with a producer NF. The method further includes querying, by the NRF and via a producer NF reachability status application programming interface (API) provided by an SCP, the SCP to determine reachability status of the producer NF. The method further includes receiving, by the NRF and from the SCP, a producer NF reachability status API response message including an indication that the producer NF is reachable. The method further includes maintaining, by the NRF and in response to receiving the indication that the producer NF is reachable, a REGISTERED status for the producer NF.

20 Claims, 9 Drawing Sheets

METHODS, SYSTEMS, AND COMPUTER READABLE MEDIA FOR ACTIVELY OBTAINING PRODUCER NETWORK FUNCTION (NF) REACHABILITY STATUS INFORMATION BY NF REPOSITORY FUNCTION (NRF) IN RESPONSE TO NF HEART-BEAT FAILURE

TECHNICAL FIELD

The subject matter described herein relates to managing producer NF reachability status information. More particularly, the subject matter described herein relates to an NRF that actively obtains producer NF reachability status information from a service communication proxy (SCP) in response to an NF heart-beat failure

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and subsequent generation networks relates to marking, in state information maintained by the NRF, producer NFs as SUSPENDED when the producer NFs are reachable. When a producer NF registers with the NRF, the NRF communicates an NF heart-beat timer value to the producer NF. The NF heart-beat timer value is a value indicating the number of seconds expected by the NRF between two consecutive NF heart-beat request messages from the producer NF. After registration, the producer NF is expected to send NF heart-beat request messages to the NRF at least as frequently as the NF heart-beat timer value, and, in response, the NRF maintains a status of REGISTERED for the producer NF in the NF profiles database maintained by the NRF. If the producer NF fails to send an NF heart-beat request message within the interval defined by the NF heart-beat timer value, the NRF changes the status of the producer NF to SUSPENDED in the NF profiles database. An NF profile with a status of SUSPENDED is not discoverable via the NF discovery service operation.

In some instances, consecutive NF heart-beat request messages from a producer NF fail to reach the NRF within the time interval specified by the NF heart-beat timer value, even when the producer NF is reachable. This may be due to network congestion or other network issues that could cause the NF heart-beat request messages not to reach the NRF. In such cases, the NRF will mark the producer NF as SUSPENDED when the producer NF is reachable. Marking the producer NF as SUSPENDED will prevent the producer NF from being discovered via the NF discovery service operation, and consumer NFs will not be able to send service-based interface (SBI) request messages to the producer NF. Because this result is undesirable, there exists a need for improved methods, systems, and computer-readable media for the NRF to obtain producer NF reachability status information.

SUMMARY

A method for actively obtaining producer network function (NF) reachability status information by an NF repository function (NRF) in response to an NF heart-beat failure includes detecting, by an NRF, an NF heart-beat failure associated with a producer NF. The method further includes querying, by the NRF and via a producer NF reachability status application programming interface (API) provided by an SCP, the SCP to determine reachability status of the producer NF. The method further includes receiving, by the NRF and from the SCP, a producer NF reachability status API response message including an indication that the producer NF is reachable. The method further includes maintaining, by the NRF and in response to receiving the indication that the producer NF is reachable, a REGISTERED status for the producer NF.

According to another aspect of the subject matter described herein, querying the SCP via the producer NF reachability status API includes generating a request message including a hypertext transfer protocol (HTTP) GET method, an indication that producer NF reachability status is requested, an NF instance ID of the producer NF, and an NF profile of the producer NF and transmitting the request message to the SCP.

According to another aspect of the subject matter described herein, detecting the NF heart-beat failure associated with the producer NF includes receiving an NF register request message for registering the producer NF with the NRF, registering the producer NF, transmitting an NF register response message to the producer NF, the NF register response message including an NF heart-beat time value, starting an NF heart-beat timer for the producer NF and determining that an NF heart-beat request has not been received from the producer NF prior to the NF heart-beat timer reaching the NF heart-beat time value.

According to another aspect of the subject matter described herein, the method for obtaining producer NF reachability status information includes determining, by the SCP, that the producer NF is reachable.

According to another aspect of the subject matter described herein, determining that the producer NF is reachable includes determining that the producer NF is reachable by monitoring responses to service-based interface (SBI) request messages transmitted by the SCP to the producer NF.

According to another aspect of the subject matter described herein, determining that the producer NF is reachable includes transmitting a reachability test message from the SCP to the producer NF and receiving, by the SCP and from the producer NF, a reachability test response message within a response timeout period.

According to another aspect of the subject matter described herein, transmitting a reachability test message from the SCP to the producer NF includes transmitting a packet internet groper (PING) message to the producer NF.

According to another aspect of the subject matter described herein, receiving the producer NF reachability status API response message includes receiving a message with a 200 OK status code, an NF instance ID of the producer NF, and the indication that the producer NF is reachable.

According to another aspect of the subject matter described herein, the method for determining producer NF reachability status information includes, at the NRF, resetting an NF heart-beat timer associated with the producer NF in response to receiving the producer NF reachability status API response message indicating that the producer NF is reachable.

According to another aspect of the subject matter described herein, maintaining the REGISTERED status of the producer NF includes refraining from changing a value of an nfStatus attribute of an NF profile of the producer NF from REGISTERED to SUSPENDED.

According to another aspect of the subject matter described herein, a system for actively obtaining producer network function (NF) reachability status information by an NF repository function (NRF) in response to an NF heart-beat failure is provided. The system includes an NRF including at least one processor and a memory. The system further includes an NF profiles data manager executable by the at least one processor for detecting an NF heart-beat failure associated with a producer NF, querying, via a producer NF reachability status application programming interface (API) provided by an SCP, the SCP to determine reachability status of the producer NF, receiving, from the SCP, a producer NF reachability status API response message including an indication that the producer NF is reachable, and maintaining, in response to receiving the indication that the producer NF is reachable, a REGISTERED status for the producer NF.

According to another aspect of the subject matter described herein, in querying the SCP via the producer NF reachability status API, the NF profiles data manager is configured to generate a request message including a hypertext transfer protocol (HTTP) GET method, an indication that producer NF reachability status is requested, an NF instance ID of the producer NF, and an NF profile of the producer NF and transmit the request message to the SCP.

According to another aspect of the subject matter described herein, in detecting the NF heart-beat failure associated with the producer NF, the NF profiles data manager is configured to receive an NF register request message for registering the producer NF with the NRF, register the producer NF, transmit an NF register response message to the producer NF, the NF register response message including an NF heart-beat time value, start an NF heart-beat timer for the producer NF and determine that an NF heart-beat request has not been received from the producer NF prior to the NF heart-beat timer reaching the NF heart-beat time value.

According to another aspect of the subject matter described herein, the system for obtaining producer NF reachability status information includes the SCP, and the SCP is configured to determine that the producer NF is reachable.

According to another aspect of the subject matter described herein, the SCP is configured to determine that the producer NF is reachable by monitoring responses to service-based interface (SBI) request messages transmitted by the SCP to the producer NF.

According to another aspect of the subject matter described herein, the SCP is configured to determine that the producer NF is reachable by transmitting a reachability test message from the SCP to the producer NF and receiving from the producer NF, a reachability test response message within a response timeout period.

According to another aspect of the subject matter described herein, the producer NF reachability status API response message includes a 200 OK status code, an NF instance ID of the producer NF, and the indication that the producer NF is reachable.

According to another aspect of the subject matter described herein, the NF profiles data manager is configured to reset an NF heart-beat timer associated with the producer NF in response to receiving the producer NF reachability status API response message indicating that the producer NF is reachable.

According to another aspect of the subject matter described herein, the NF profiles data manager is configured to maintain the REGISTERED status of the producer NF by refraining from changing a value of an nfStatus attribute of the NF profile of the producer NF from REGISTERED to SUSPENDED.

According to another aspect of the subject matter described herein, a non-transitory computer readable medium having stored thereon executable instructions that when executed by a processor of a computer control the computer to perform steps is provided. The steps include detecting, by a network function (NF) repository function (NRF), an NF heart-beat failure associated with a producer NF. The steps further include querying, by the NRF and via a producer NF reachability status application programming interface (API) provided by an SCP, the SCP to determine reachability status of the producer NF. The steps further include receiving, by the NRF and from the SCP, a producer NF reachability status API response message including an indication that the producer NF is reachable. The steps further include maintaining, by the NRF and in response to receiving the indication that the producer NF is reachable, a REGISTERED status for the producer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
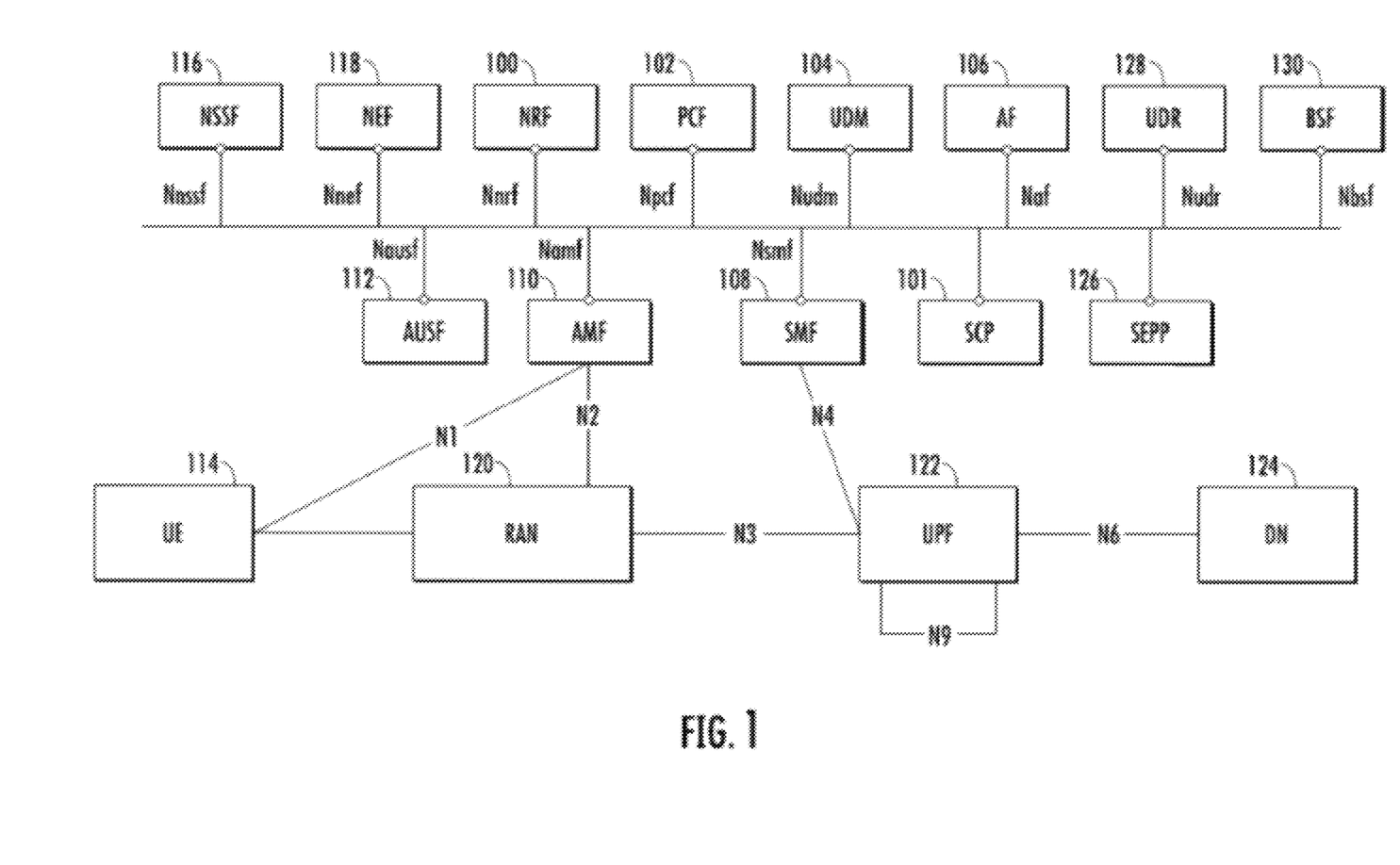
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As described above, one problem that can occur in 5G and subsequent generation networks is that a producer NF may be marked as SUSPENDED by the NRF even though the producer NF is reachable. To illustrate the problem and the solution, the NFRegister, NF heart-beat, and NFDiscover service operations will first be described. A detailed description of the problem and the proposed solution will then be presented.

Figure 2:
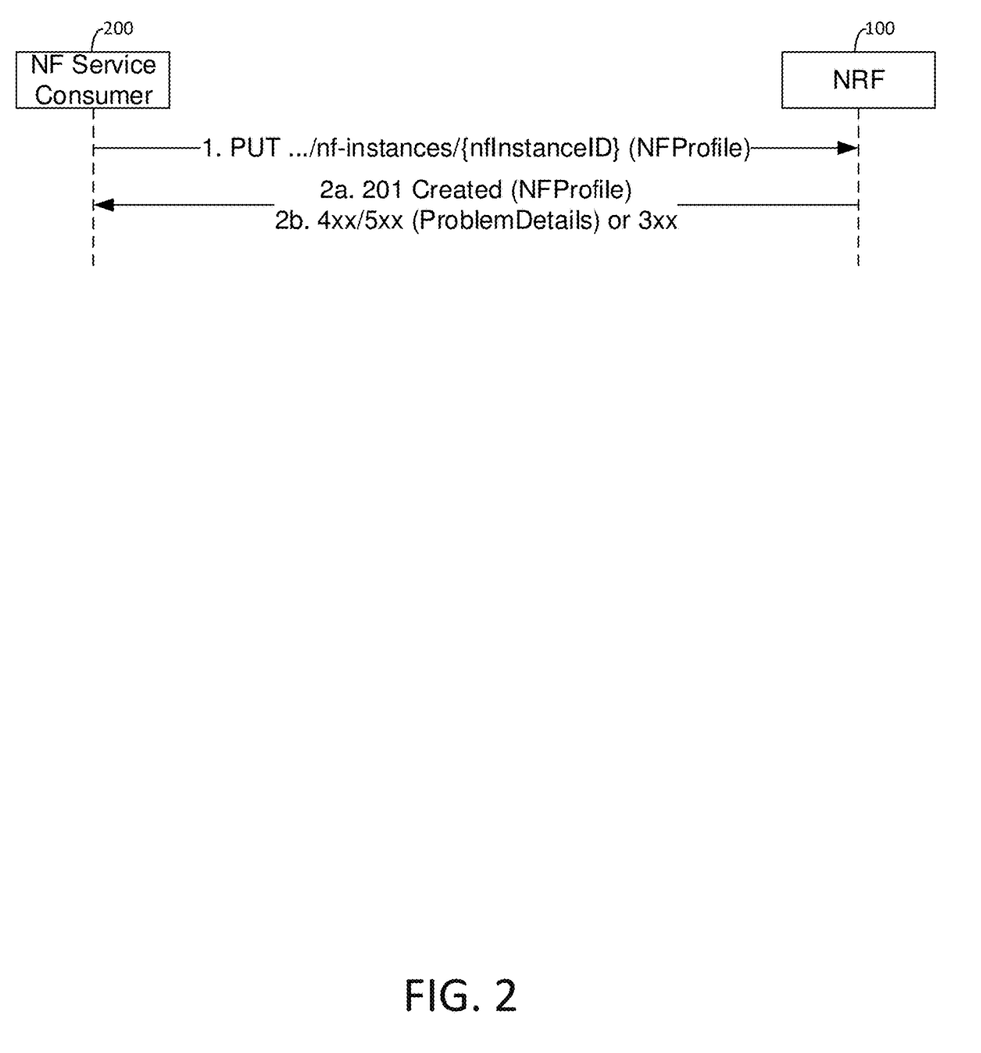
FIG. 2 is a message flow diagram illustrating exemplary messages exchanged in the NFRegister service operation.

FIG. 2 is a message flow diagram illustrating exemplary messages exchanged in the NFRegister service operation. Referring to FIG. 2, in step 1, an NF service consumer 200 sends an NF register request to NRF 100. The NF register request includes an HTTP PUT method along with the NF instance ID and the NF profile of NF service consumer 200. If the registration is successful, NRF 100 responds as indicated in step 2a with a registration response message including a 201 Created status code and the NF profile of NF service consumer 200. The NF registration response also includes a heart-beat timer value which indicates the expected number of seconds between two consecutive NF heart-beat request messages from NF service consumer 200 to NRF 100. If the NF register operation fails or is redirected, NRF 100 responds as indicated in step 2b with a 4xx or 5xx message indicating problem details or a 3xx message indicating redirection.

Figure 3:
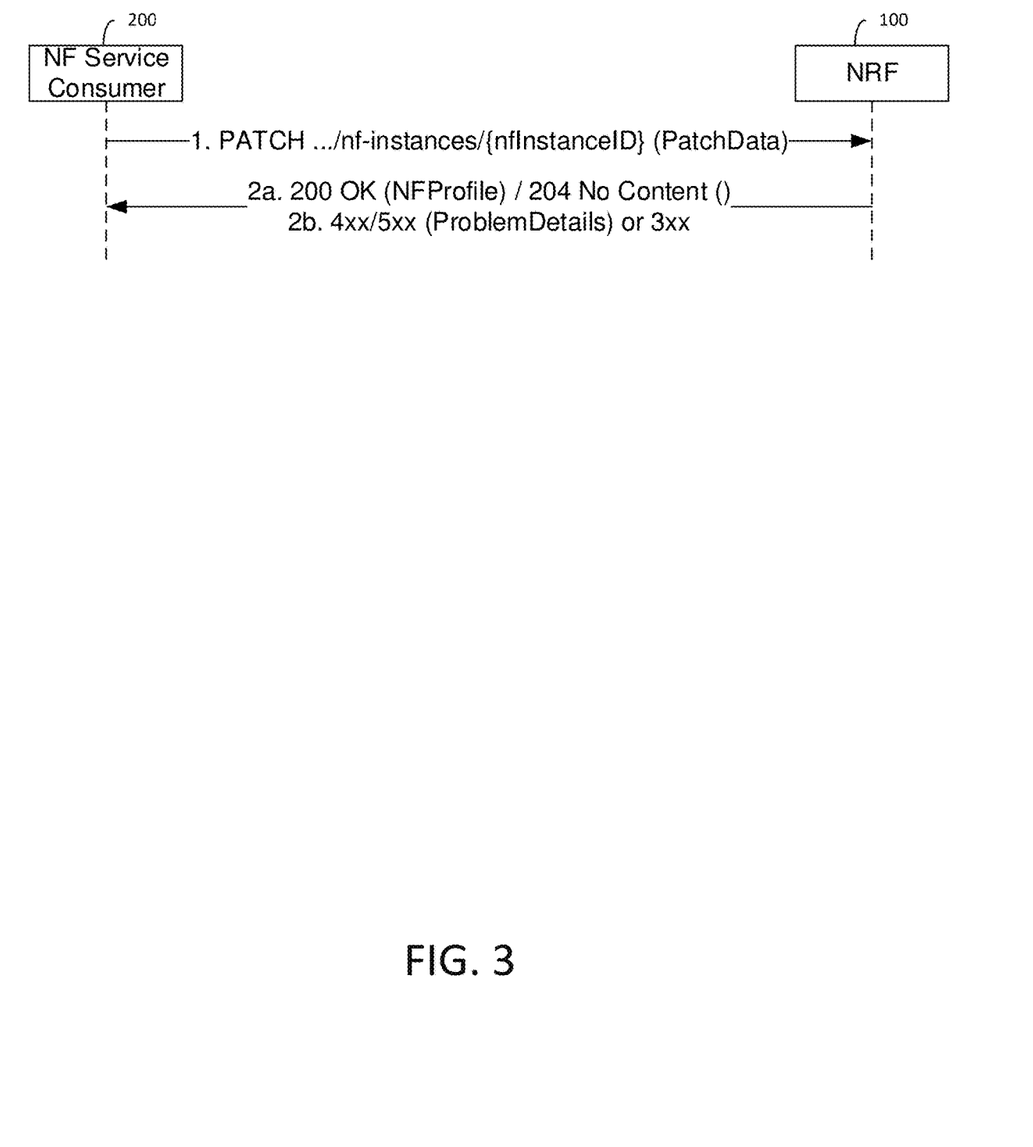
FIG. 3 is a message flow diagram illustrating exemplary messages exchanged in the NF heart-beat service operation.

FIG. 3 is a message flow diagram illustrating exemplary messages exchanged in the NF heart-beat service operation. Referring to FIG. 3, in step 1, NF service consumer 200 sends an NF heart-beat request to NRF 100. The NF heart-beat request includes an HTTP PATCH method along with the NF instance ID of NF service consumer 200. The NF heart-beat request also includes a replace operation on the nfStatus attribute of the NF profile of NF service consumer 200 and sets the value of the nfStatus attribute to REGISTERED or UNDISCOVERABLE. If the NF heart-beat service operation is successful, NRF 100 resets the NF heart-beat timer for NF service consumer 200 and responds as indicated in step 2a with an NF heart-beat response message including a 204 No Content status code or a 200 OK status code and the NF profile of NF service consumer 200. The 204 No Content status code is used when there are no significant changes to the NF profile of NF service consumer 200. The 200 OK status code and the NF profile are sent when NRF 100 determines that significant changes to the NF profile have occurred since the last NF heart-beat request received from NF service consumer 200. If the NF heart-beat operation fails or is redirected, NRF 100 responds as indicated in step 2b with a 4xx or 5xx message indicating problem details or a 3xx message indicating redirection.

When the NRF detects that a given NF has not updated its profile for a configurable amount of time (longer than the heart-beat interval), the NRF changes the status of the NF to SUSPENDED and considers that the NF and its services can no longer be discovered by other NFs via the NF discovery service. The NRF notifies NFs subscribed to receive notifications of changes of the NF profile that the NF status has been changed to SUSPENDED.

Figure 4:
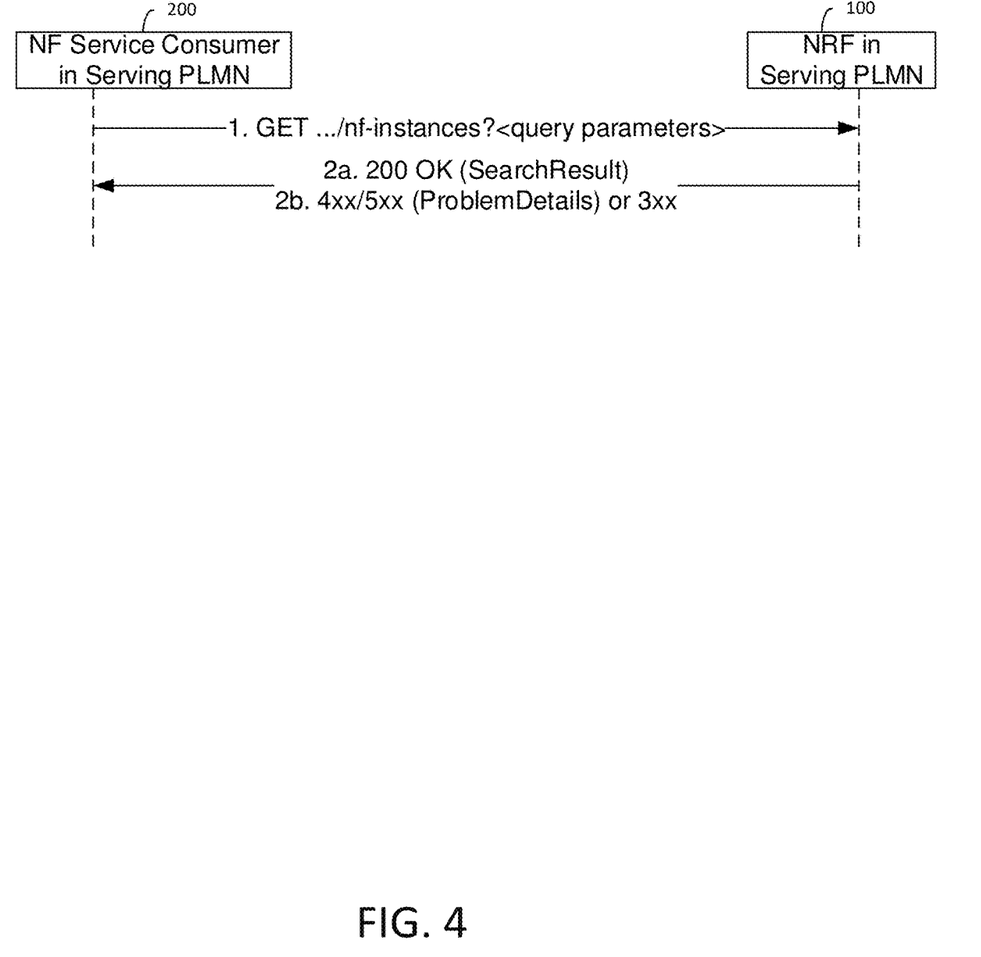
FIG. 4 is a message flow diagram illustrating exemplary messages exchanged in the NFDiscover service operation.

FIG. 4 is a message flow diagram illustrating exemplary messages exchanged in the NFDiscover service operation. Referring to FIG. 4, in step 1 an NF service consumer 200 sends an NF discovery request to NRF 100. The NF discovery request includes an HTTP GET method along with query parameters to be used in locating NF profiles of producer NFs. If the NF discovery service operation is successful, NRF 100 responds as indicated in step 2a with an NF discovery response message including a 200 OK status code and NF profiles of producer NFs having attributes that match the query parameters in the NF discovery request and that have a REGISTERED status. If an NF profile has a SUSPENDED status, it is not returned in the NF discovery response, even if the NF profile has attributes that match the query parameters in the NF discovery request. If the NF discovery operation fails or is redirected, NRF 100 responds as indicated in step 2b with a 4xx or 5xx message indicating problem details or a 3xx message indicating redirection.

Figure 5:
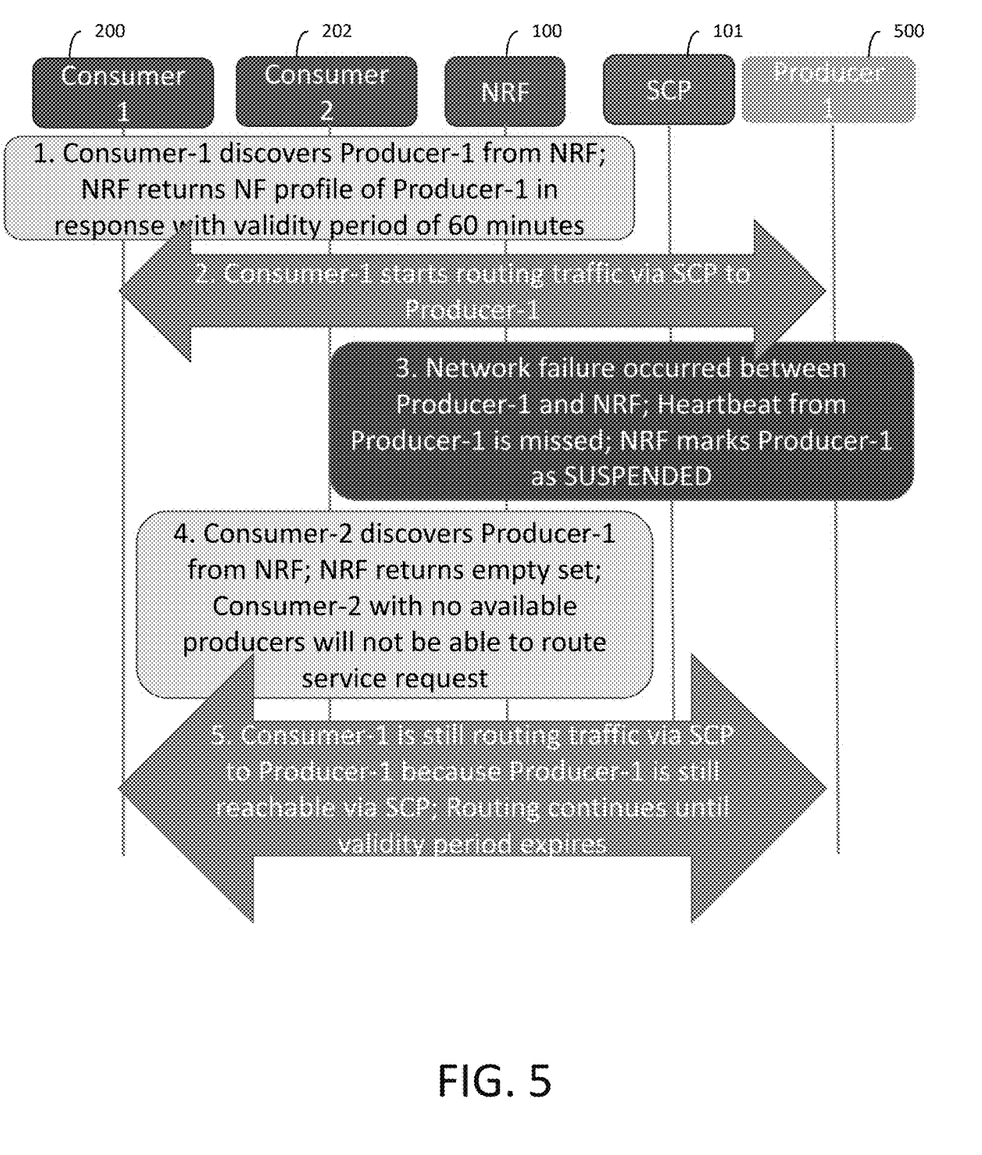
FIG. 5 is a network diagram illustrating a problem that can occur when a reachable producer NF fails to heart-beat to an NRF.

FIG. 5 is a network diagram illustrating a problem that can occur when a reachable producer NF fails to heart-beat to an NRF. Referring to FIG. 5, in step 1, consumer NF 200 uses the NF discovery service operation to discover the NF profile of producer NF 500 from NRF 100. In the NF discovery response, NRF 100 returns a validity period of 60 minutes for the NF discovery results. In step 2, consumer NF 200 routes traffic to producer NF 500 via SCP 101. In step 3, a routing failure or network failure occurs between producer NF 500 and NRF 100, which causes an NF heart-beat request from producer NF 500 not to reach NRF 100. Because NRF 100 does not receive the NF heart-beat request within the specified time interval, NRF 100 marks producer NF 500 as SUSPENDED. In step 4, a second consumer NF 202 performs NF discovery with NRF 100. The NF discovery query parameters match attributes in the NF profile of producer NF 500. However, because producer NF 500 has a SUSPENDED state, NRF 100 does not return the NF profile of producer NF 500 and instead returns an empty set. In this example, consumer NF 202 has no available NF service producers for providing the service required by the service request that prompted the NF discovery service operation in step 4. As indicated by step 5, consumer NF 200 can continue route traffic to producer NF 500 until the validity period for the initial NF discovery results expires. However, once the validity period expires and the NF profile of producer NF is marked as SUSPENDED, consumer NF 200 can no longer discover or route traffic to producer NF 500, even though producer NF 500 is reachable via SCP 101.

In production networks, producer NFs sometimes fail to exchange regular heart-beats with the NRF (due to intermittent or persistent network failures between the producer NFs and the NRF). However, the producer NFs may be available and could potentially handle service requests. Because the consumer NF does not receive any NF profiles in its NF discovery response, the consumer NF may be required to fail an ongoing transaction, resulting in failed calls. The SCP may still be able to route traffic to the producer NF for consumer NFs which have discovered and selected the producer NF before the NRF marked the producer NF as SUSPENDED. However, once the validity periods of the NF discovery results expire, the consumer NFs are required to refresh their NF discovery results, and the producer NF in the SUSPENDED state will be undiscoverable. Even though the SCP may have more current reachability status information of the producer NF, the NRF uses the NF heart-beat service operation to determine the status of the producer NF.

The SCP may have more current reachability status associated with the producer NF than the NRF because the SCP may be actively routing service requests to the producer NF. In the solution described herein, when the NRF detects an NF heart-beat failure with a producer NF, instead of marking the producer NF as SUSPENDED, the NRF queries the SCP via a producer NF reachability status API provided by the SCP to determine whether the SCP is currently able to successfully route traffic to the producer NF or not. If the SCP reports that it is successfully routing traffic to the producer NF, the NRF may skip processing the current heart-beat failure, maintain the status of the producer NF as REGISTERED, and restart the NF heart-beat timer for the producer NF. If an NF discovery request is received before the next expiration of the NF heart-beat timer, the NRF will respond with the NF profile of the producer NF. If the SCP is not currently routing traffic to the producer NF, the SCP may initiate an HTTP2 PING with the producer NF and respond to the producer NF reachability status query with results of the HTTP2 PING operation. If the producer NF responds to the HTTP2 PING request, the NRF may skip processing the current NF heart-beat failure and restart the NF heart-beat timer. If the producer NF does not respond to the PING request, the SCP notifies the NRF that the producer NF is not reachable, and the NRF marks the producer NF as SUSPENDED.

Figure 6:
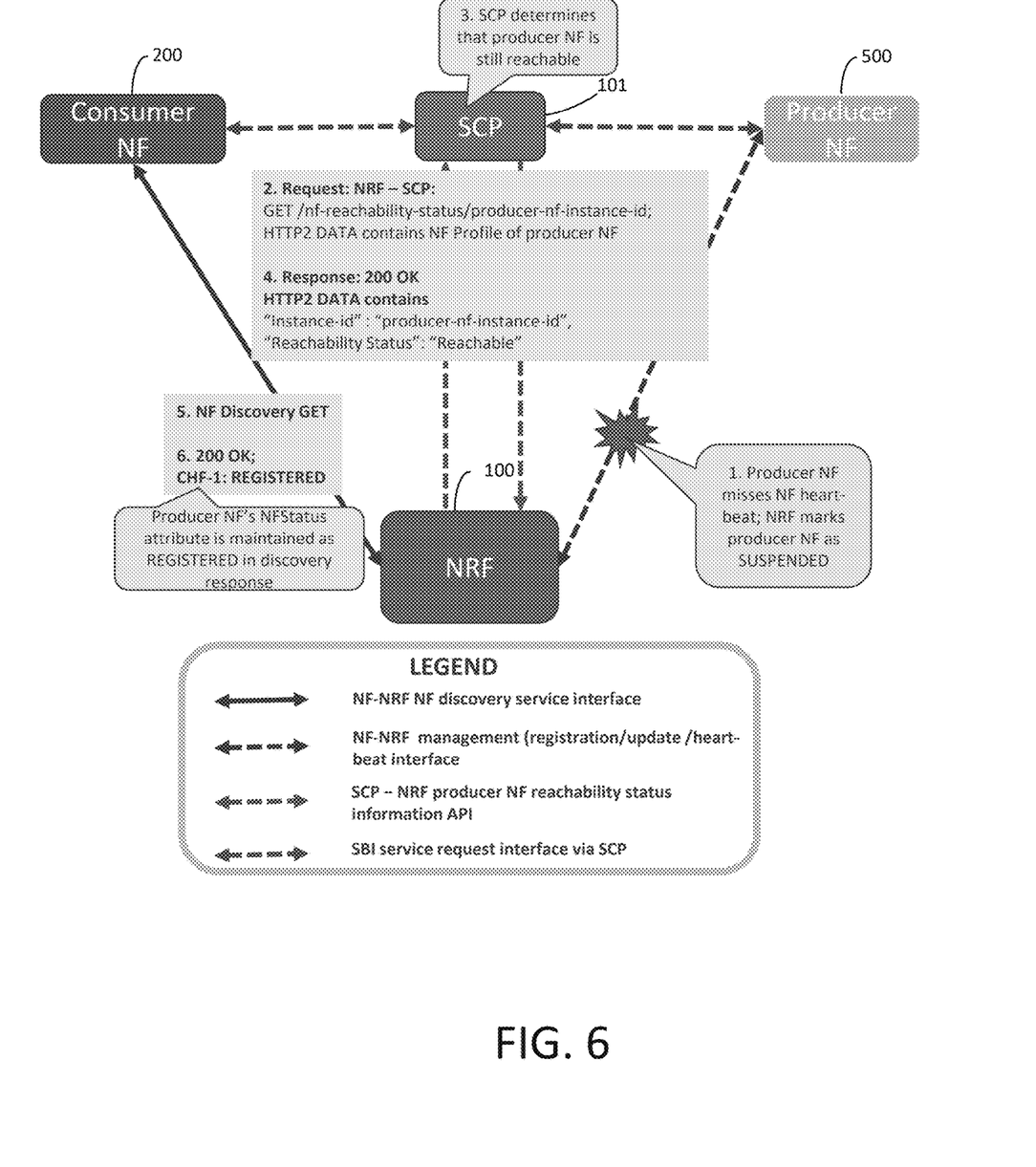
FIG. 6 is a network diagram illustrating a mechanism by which the NRF can obtain reachability status information for a producer NF whose NF heart-beat timer has expired.

FIG. 6 is a network diagram illustrating a mechanism by which the NRF can obtain reachability status information for a producer NF whose NF heart-beat timer has expired. Referring to the message flow in FIG. 6, in step 1, producer NF 500 fails to send an NF heart-beat request to NRF 100 within an NF heart-beat time interval. NRF 100 detects the failure and, in step 2, sends, via the producer NF reachability status API provided by SCP 101, a producer NF reachability status query to SCP 101. The producer NF reachability status query includes an HTTP GET status code, an indication that producer NF reachability status is requested, the NF instance ID of the producer NF whose reachability status is being requested, and the NF profile of the producer NF whose reachability status is being requested. In step 3, SCP 101 receives the request and determines that producer NF 500 is still reachable. In step 4, SCP 101 generates and sends a producer NF reachability status response message to NRF 100. The producer NF reachability status response message includes a 200 OK status code, the NF instance ID of the producer NF whose reachability status is being requested, and an indicator of the reachability status of producer NF 500. As indicated above, SCP 101 may determine the current reachability status of producer NF 600 due to successful routing of SBI request messages to producer NF 500 or using the HTTP2 PING process.

NRF 100 receives the producer NF reachability status response, reads the producer NF reachability status indicator indicating that producer NF 500 is reachable, and maintains the status of producer NF 500 as REGISTERED. In step 5, NRF 100 receives an NF discovery request from consumer NF 200. In step 6, NRF 100 generates and sends an NF discovery response including the NF profile of producer NF 500.

Figure 7:
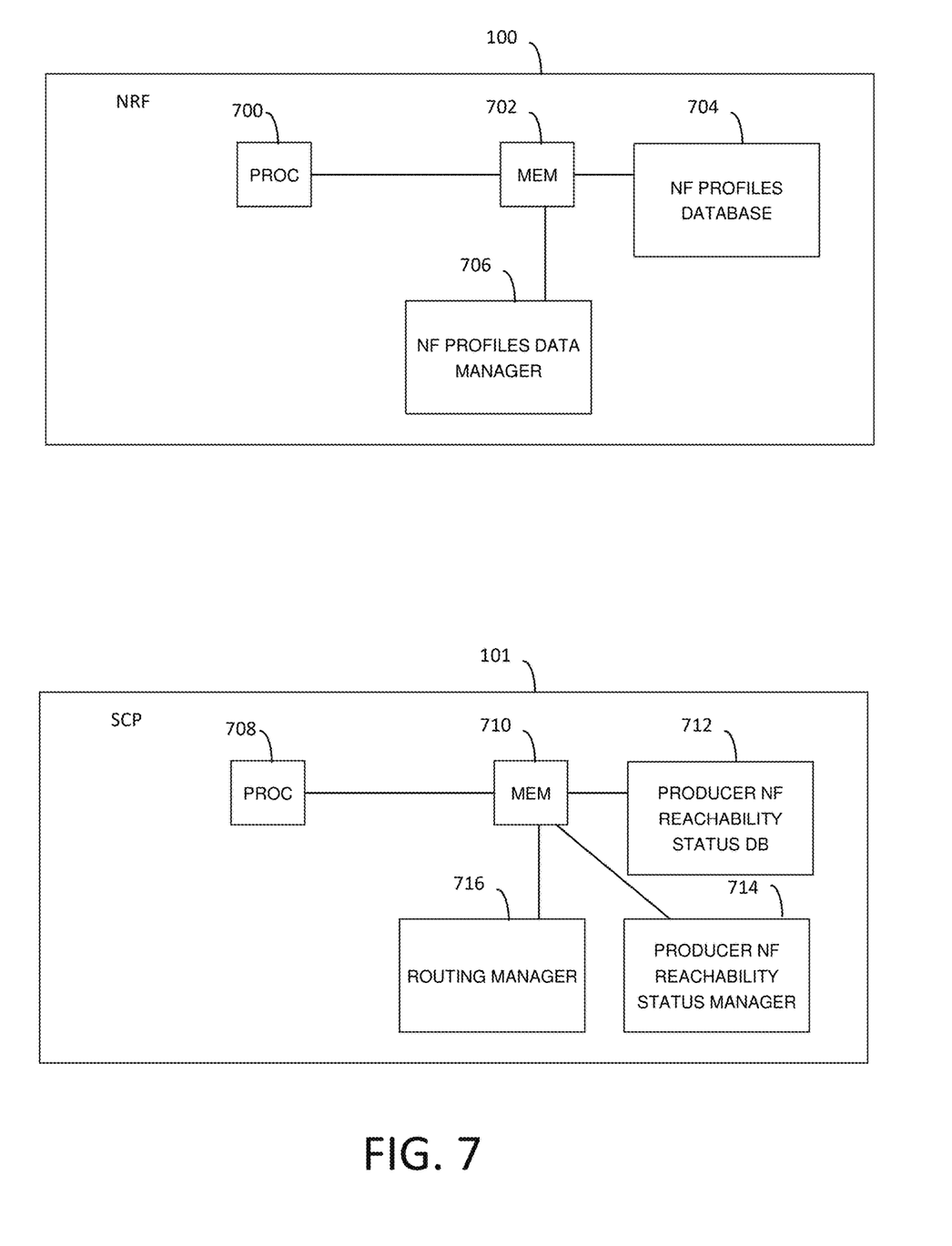
FIG. 7 is a block diagram illustrating exemplary architectures of an NRF and an SCP that enable the SCP to determine producer NF reachability status information and that enable the NRF to obtain the producer NF reachability status information from the SCP.

FIG. 7 is a block diagram illustrating exemplary architectures of an NRF and an SCP that enable the SCP to determine producer NF reachability status information and that enable the NRF to obtain the producer NF reachability status information from the SCP. Referring to FIG. 7, NRF 100 includes at least one processor 700 and memory 702. NRF 100 further includes an NF profiles database 704 that stores NF profiles of NFs that are registered with NRF 100. NRF 100 further includes an NF profiles data manager 706 that provides the discovery, registration, subscription, management and other interfaces to NF profiles database 704 described in 3GPP TS 29.510. NF profiles data manager 706 may also query SCP 101 for producer NF reachability status information and store the producer NF reachability status information in NF profiles database 704. NF profiles data manager 706 may be implemented using computer executable instructions stored in memory 702 and executed by processor 700.

SCP 101 includes at least one processor 708 and memory 710. SCP 101 further includes a producer NF reachability status database 712 that stores reachability status information for producer NFs to which SCP 100 routes SBI request messages. SCP 101 further includes a producer NF reachability status manager 714 that determines producer NF reachability status information (either by monitoring results of routing SBI request messages to producer NFs or using reachability status test messages), stores indications of reachability status in database 712, and provides the producer NF reachability status API through which NRF 100 can request and obtain producer NF reachability status information. SCP 101 further includes a routing manager 716 that routes messages to producer NFs. Producer NF reachability status manager 714 and routing manager 716 may be implemented using computer executable instructions stored in memory 710 and executed by processor 708.

Figure 8:
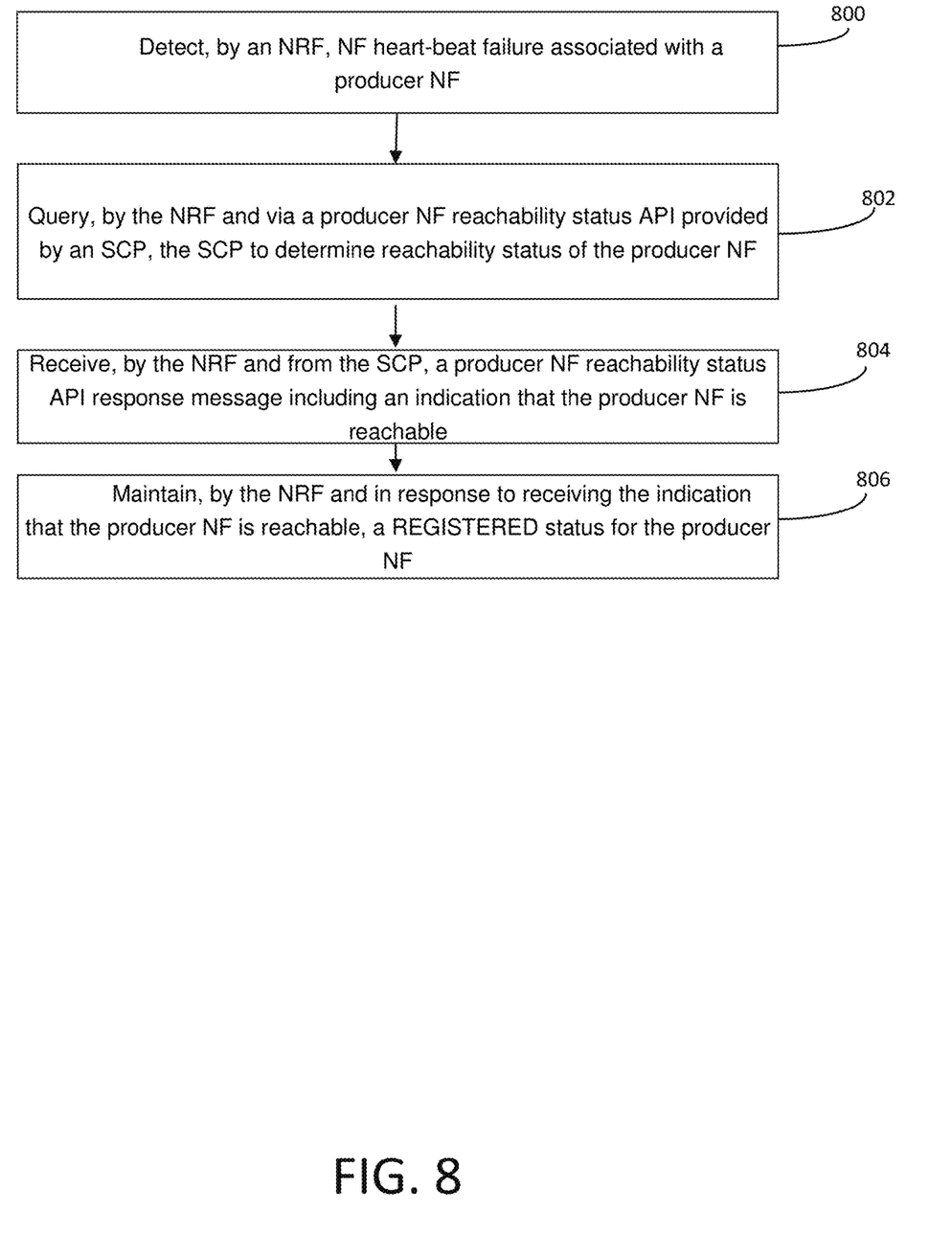
FIG. 8 is a flow chart illustrating an exemplary process performed by the NRF to obtain reachability status information regarding a producer NF whose NF heart-beat timer has expired.

FIG. 8 is a flow chart illustrating an exemplary process performed by the NRF to obtain reachability status information regarding a producer NF whose NF heart-beat timer has expired. Referring to FIG. 8, in step 800, the process includes detecting, by an NRF, an NF heart-beat failure associated with a producer NF. For example, an NRF, such as NRF 100, may detect that an NF heart-beat timer for a producer NF reaches the NF heart-beat timer value received from the NRF without receiving an NF heart-beat request message from the producer NF.

In step 802, the process includes querying, by the NRF and via a producer NF reachability status API provided by an SCP, the SCP to determine reachability status of the producer NF. For example, an NRF, such as NRF 100, may query an SCP using the producer NF reachability status API to determine whether a producer NF whose NF heart-beat timer has expired is reachable via the SCP.

In step 804, the process further includes receiving, by the NRF and from the SCP, a producer NF reachability status API response message including an indication that the producer NF is reachable. For example, an NRF, such as NRF 100, may receive a response from an SCP indicating that a producer NF is reachable via the SCP, even though the producer NF failed to provide an NF heart-beat request within the required NF heart-beat time interval.

In step 806, the process includes maintaining, by the NRF and in response to receiving the indication that the producer NF is reachable, a REGISTERED status for the producer NF. For example, an NRF, such as NRF 100, may refrain from changing the value of an nfStatus attribute of the NF profile of the producer NF from REGISTERED to SUSPENDED in response to receiving the reachability status information from the SCP that indicates that the producer NF is reachable.

Figure 9:
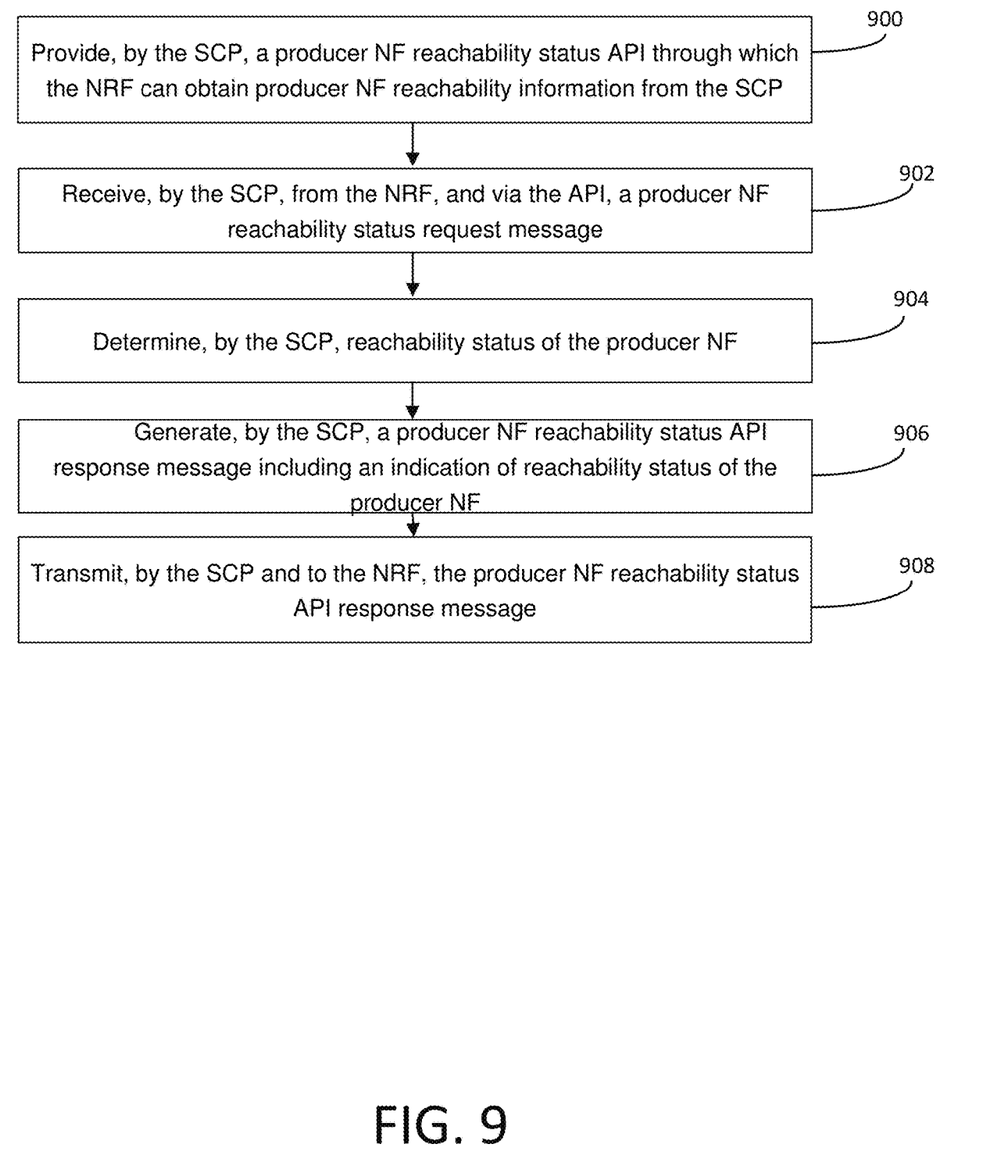
FIG. 9 is a flow chart illustrating an exemplary process performed by the SCP to obtain reachability status information regarding a producer NF and enable the NRF to retrieve the producer NF reachability status information from the SCP.

FIG. 9 is a flow chart illustrating an exemplary process performed by the SCP to obtain reachability status information regarding a producer NF and enable the NRF to retrieve the producer NF reachability status information from the SCP. Referring to FIG. 9, in step 900, the process includes providing, by the SCP, a producer NF reachability status API through which the NRF can obtain producer NF reachability status information from the SCP. For example, an SCP, such as SCP 101, may provide an API through which NRFs can query the SCP to obtain producer NF reachability status information.

In step 902, the process further includes receiving, by the SCP, from the NRF, and via the API, a producer NF reachability status request message. For example, an SCP, such as SCP 101, may receive a query message including an HTTP GET method, the NF instance ID of the producer NF whose status is being requested, an indication that the query message is requesting reachability status, and the NF profile of the producer NF whose reachability status is being requested.

In step 904, the process further includes determining, by the SCP, reachability status of the producer NF. For example, an SCP, such as SCP 101, may monitor the status of routing of SBI request messages to a producer NF to determine the reachability status or may test the producer NF to determine the reachability status by transmitting test messages (such as PING messages) to the producer NF.

In step 906, the process includes generating, by the SCP, a producer NF reachability status API response message including an indication of reachability status of the producer NF. For example, an SCP, such as SCP 101, may generate a producer NF reachability status API response message including the NF instance ID of the producer NF whose reachability status was requested and the indication of the reachability status of the producer NF.

In step 908, the process includes transmitting, by the SCP and to the NRF, the producer NF reachability status API response message. For example, an SCP, such as SCP 101, may transmit a producer NF reachability status API response message to the querying NRF.

Exemplary advantages of the subject matter described herein include efficient NF status handling at the NRF by obtaining an NF's reachability status from the SCP. Obtaining an NF's reachability status from the SCP and using the reachability status to maintain a REGISTERED status of a producer NF may reduce the number of unnecessary call failures and unnecessary routing path updates in the network.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.6.0 (2024-03)
2. 3$^{rd}$ Generation Partnership Project; Technical Specification Group Services and System Aspects; System architecture for the 5G System (5GS); Stage 2 (Release 18) 3GPP TS 23.501 V18.5.0 (2024-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for actively obtaining producer network function (NF) reachability status information by an NF repository function (NRF) in response to an NF heart-beat failure, the method comprising:
    detecting, by an NRF, an NF heart-beat failure associated with a producer NF;
    querying, by the NRF and via a producer NF reachability status application programming interface (API) provided by a service communication proxy (SCP), the SCP to determine reachability status of the producer NF;
    receiving, by the NRF and from the SCP, a producer NF reachability status API response message including an indication that the producer NF is reachable; and
    maintaining, by the NRF and in response to receiving the indication that the producer NF is reachable, a REGISTERED status for the producer NF.

2. The method of claim 1 wherein querying the SCP via the producer NF reachability status API includes generating a request message including a hypertext transfer protocol (HTTP) GET method, an indication that producer NF reachability status is requested, an NF instance ID of the producer NF, and an NF profile of the producer NF and transmitting the request message to the SCP.

3. The method of claim 1 wherein detecting the NF heart-beat failure associated with the producer NF includes:
    receiving an NF register request message for registering the producer NF with the NRF;
    registering the producer NF, transmitting an NF register response message to the producer NF, the NF register response message including an NF heart-beat time value; and
    starting an NF heart-beat timer for the producer NF and determining that an NF heart-beat request has not been received from the producer NF prior to the NF heart-beat timer reaching the NF heart-beat time value.

4. The method of claim 1 comprising determining, by the SCP, that the producer NF is reachable.

5. The method of claim 4 wherein determining that the producer NF is reachable includes determining that the producer NF is reachable by monitoring responses to service-based interface (SBI) request messages transmitted by the SCP to the producer NF.

6. The method of claim 4 wherein determining that the producer NF is reachable includes transmitting a reachability test message from the SCP to the producer NF and receiving, by the SCP and from the producer NF, a reachability test response message within a response timeout period.

7. The method of claim 6 wherein transmitting a reachability test message from the SCP to the producer NF includes transmitting a packet internet groper (PING) message to the producer NF.

8. The method of claim 1 wherein receiving the producer NF reachability status API response message includes receiving a message with a 200 OK status code, an NF instance ID of the producer NF, and the indication that the producer NF is reachable.

9. The method of claim 1 comprising, at the NRF, resetting an NF heart-beat timer associated with the producer NF in response to receiving the producer NF reachability status API response message indicating that the producer NF is reachable.

10. The method of claim 1 wherein maintaining the REGISTERED status of the producer NF includes refraining from changing a value of an nfStatus attribute of an NF profile of the producer NF from REGISTERED to SUSPENDED.

11. A system for actively obtaining producer network function (NF) reachability status information by an NF repository function (NRF) in response to an NF heart-beat failure, the system comprising:
    an NRF including at least one processor and a memory; and
    an NF profiles data manager executable by the at least one processor for detecting an NF heart-beat failure associated with a producer NF, querying, via a producer NF reachability status application programming interface (API) provided by a service communication proxy (SCP), the SCP to determine reachability status of the producer NF, receiving, from the SCP, a producer NF reachability status API response message including an indication that the producer NF is reachable, and maintaining, in response to receiving the indication that the producer NF is reachable, a REGISTERED status for the producer NF.

12. The system of claim 11 wherein, in querying the SCP via the producer NF reachability status API, the NF profiles data manager is configured to generate a request message including a hypertext transfer protocol (HTTP) GET method, an indication that producer NF reachability status is requested, an NF instance ID of the producer NF, and an NF profile of the producer NF and transmit the request message to the SCP.

13. The system of claim 11 wherein, in detecting the NF heart-beat failure associated with the producer NF, the NF profiles data manager is configured to:
  receive an NF register request message for registering the producer NF with the NRF;
  register the producer NF, transmit an NF register response message to the producer NF, the NF register response message including an NF heart-beat time value; and
  start an NF heart-beat timer for the producer NF and determine that an NF heart-beat request has not been received from the producer NF prior to the NF heart-beat timer reaching the NF heart-beat time value.

14. The system of claim 11 comprising the SCP, wherein the SCP is configured to determine that the producer NF is reachable.

15. The system of claim 14 wherein the SCP is configured to determine that the producer NF is reachable by monitoring responses to service-based interface (SBI) request messages transmitted by the SCP to the producer NF.

16. The system of claim 14 wherein the SCP is configured to determine that the producer NF is reachable by transmitting a reachability test message from the SCP to the producer NF and receiving from the producer NF, a reachability test response message within a response timeout period.

17. The system of claim 11 wherein the producer NF reachability status API response message includes a 200 OK status code, an NF instance ID of the producer NF, and the indication that the producer NF is reachable.

18. The system of claim 11 wherein the NF profiles data manager is configured to reset an NF heart-beat timer associated with the producer NF in response to receiving the producer NF reachability status API response message indicating that the producer NF is reachable.

19. The system of claim 11 wherein the NF profiles data manager is configured to maintain the REGISTERED status of the producer NF by refraining from changing a value of an nfStatus attribute of the NF profile of the producer NF from REGISTERED to SUSPENDED.

20. A non-transitory computer readable medium having stored thereon executable instructions that when executed by a processor of a computer control the computer to perform steps comprising:
  detecting, by a network function (NF) repository function (NRF), an NF heart-beat failure associated with a producer NF;
  querying, by the NRF and via a producer NF reachability status application programming interface (API) provided by a service communication proxy (SCP), the SCP to determine reachability status of the producer NF;
  receiving, by the NRF and from the SCP, a producer NF reachability status API response message including an indication that the producer NF is reachable; and
  maintaining, by the NRF and in response to receiving the indication that the producer NF is reachable, a REGISTERED status for the producer NF.

* * * * *